United States Patent
Bhowmick

(10) Patent No.: US 10,452,758 B1
(45) Date of Patent: Oct. 22, 2019

(54) OPTIMIZING ONLINE CONTENT RENDERING

(71) Applicant: Amazon Technologies, Inc., Seattle, WA (US)

(72) Inventor: Diptendu Bhowmick, Ghatal (IN)

(73) Assignee: Amazon Technologies, Inc., Seattle, WA (US)

(*) Notice: Subject to any disclaimer, the term of this patent is extended or adjusted under 35 U.S.C. 154(b) by 3 days.

(21) Appl. No.: 15/498,142

(22) Filed: Apr. 26, 2017

(51) Int. Cl.
G06F 17/22 (2006.01)
H04L 29/08 (2006.01)
G06F 17/27 (2006.01)

(52) U.S. Cl.
CPC ...... G06F 17/2247 (2013.01); G06F 17/2705 (2013.01); H04L 67/02 (2013.01)

(58) Field of Classification Search
CPC .................................................. G06F 17/2247
See application file for complete search history.

(56) References Cited

U.S. PATENT DOCUMENTS

| | | | | |
|---|---|---|---|---|
| 2009/0083646 A1* | 3/2009 | Lin | .................. | G06F 17/30905 715/769 |
| 2010/0070872 A1* | 3/2010 | Trujillo | ............... | G06F 3/04892 715/745 |
| 2010/0114720 A1* | 5/2010 | Jones | .................. | G06Q 30/0277 705/14.73 |
| 2011/0258532 A1* | 10/2011 | Ceze | ................. | G06F 17/30902 715/234 |
| 2012/0260157 A1* | 10/2012 | Zhu | ................... | G06F 17/30902 715/234 |
| 2016/0026611 A1* | 1/2016 | Liu | ....................... | G06F 17/218 715/234 |

* cited by examiner

*Primary Examiner* — Scott T Baderman
*Assistant Examiner* — Seung Woon Jung
(74) *Attorney, Agent, or Firm* — Eversheds Sutherland (US) LLP

(57) ABSTRACT

Systems, methods, and computer-readable media are disclosed for optimizing online content rendering. In one embodiment, an example method may include determining that a document indicative of a webpage includes a content component. The content component may be configured to include multi-object content. A multi-object content may be received. The multi-object content may include a plurality of content items. A Document Object Model (DOM) tree may be generated based at least in part on the document and at least a first content item of the plurality of content items. The DOM tree may be sent to a user device requesting the webpage. A subtree may be generated based at least in part on the DOM tree and a second content item of the plurality of content items. The subtree and a command to combine the subtree and the DOM tree may be sent to the user device.

17 Claims, 9 Drawing Sheets

OPTIMIZING ONLINE CONTENT RENDERING

BACKGROUND

As user devices, such as laptops, smartphones, and tablets, have become ubiquitous, the delivery of online content has also increased. Web browsers of user devices render the online content and integrated multi-object content. A web browser may parse a Hyper Text Markup Language (HTML) and construct a Document Object Model (DOM) tree. A DOM tree is a data representation of the HTML source code. The browser may also parse the cascading style sheet (CSS) code and construct a CSS Object Model (CSSOM) tree. The browser may use the DOM tree and CSSOM tree to construct a render tree, which contains the nodes required to render the requested webpage. The browser can then use the render tree to draw the webpage on the screen of the user device.

Figure 1:
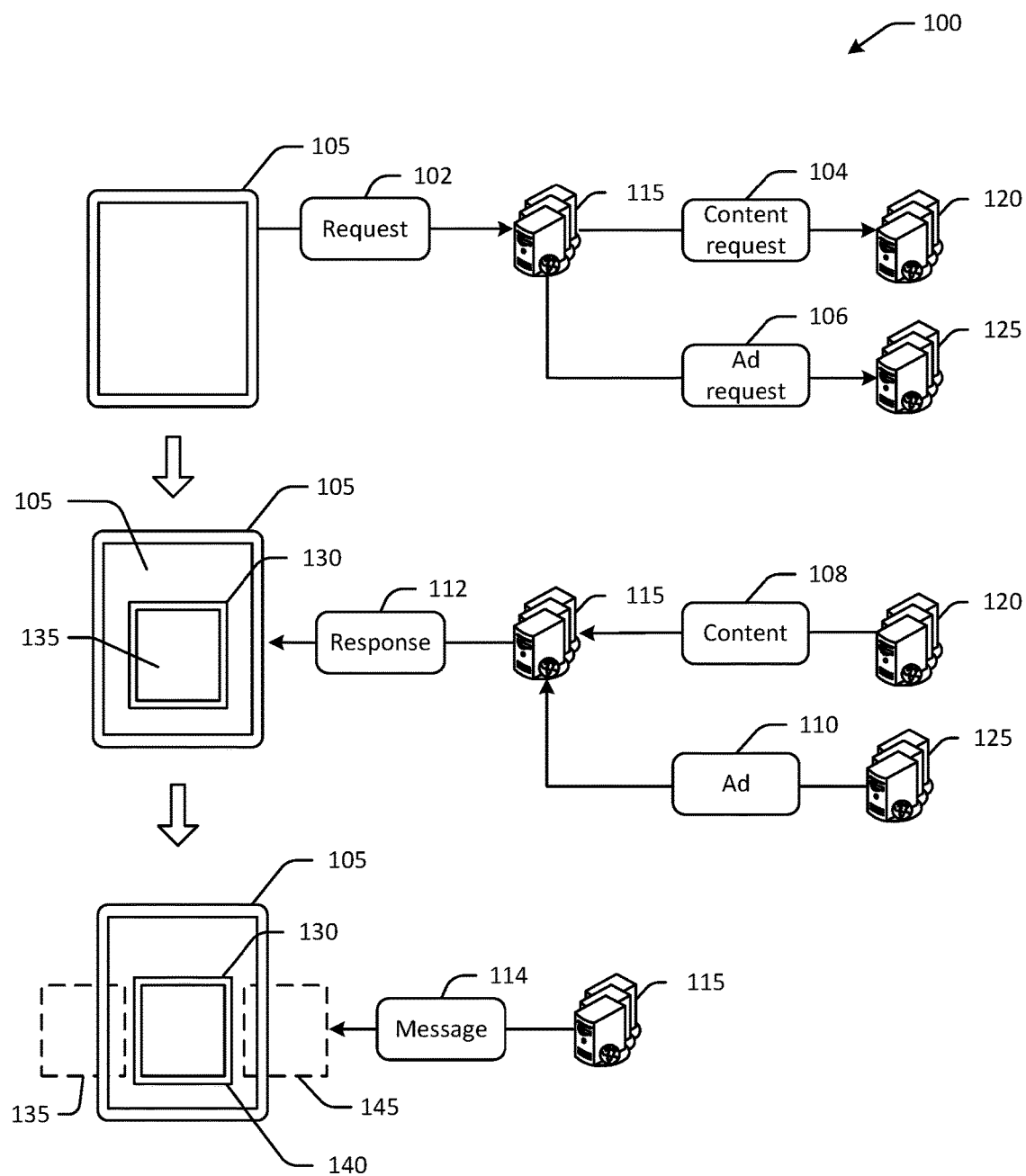
FIG. 1 is a hybrid system and process diagram for optimizing online content rendering in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Web pages rendered by the web browser of a user device may include one or more content components. The content components may be containers configured to display content for the webpage. Examples of content may include videos, photographs, images, movies, articles, books, advertisements, audio clips, and the like. In some embodiments, the content may be a multi-object content. A multi-object content may be associated with multiple content items that are displayed in a single content unit or component.

Multi-object contents are popular because of their compact look and ability to present multiple content items in a single content unit or component. Examples of content items may include photographs, videos, drawings, hyperlinks, text, and the like. Multi-object content may be able to rotate through the different content items based on a trigger, such as a specified time interval or timer, or based on receiving an indication of a user interaction with the content component or the multi-object content. Multi-object content may include multiple content items (e.g., rich in styles and interaction). The use of multi-object content can impact page load time since the page rendering gets blocked until all content items of the multi-object content are loaded.

One way to reduce the load time of the initial webpage that includes a multi-object content is by loading the multi-object content in multiple calls (e.g., AJAX or JSON). The multi-object content that loads during page load may fetch only the content item that appears on the first screen of the multi-object content. The remaining content items for the multi-object content are fetched through deferred calls and are rendered so that the user can see them as soon as they interact with the content component of the webpage. However, such a technique is resource intensive because it requires modification of the HTML structure as new content items are fetched. Changing the HTML content may require a refresh of the entire content component on the screen of the user device. Such actions (e.g., redrawing the entire screen of the user device) may consume critical battery power because reloading of a webpage causes reflow, re-layout, and repaint of the HTML elements within the webpage.

This disclosure relates to, among other things, systems, methods, computer-readable media, techniques and methodologies for optimizing online content rendering. In an illustrative example, a user may interact with a user device to request a webpage. The user device may send a request for the webpage. An optimization server may receive the request from the user device and obtain the requested web content as well as one or more multi-object content to be displayed in the webpage. A content component of the webpage may be configured to display multiple content items in a single content unit or component. Examples of content items may include videos, text, pictures, drawings, and the like. The multiple content items may be displayed in the content unit or component with a rotation animation, which may be triggered by a timer or a user interaction with the content component or multi-object content.

The optimization server may generate a Document Object Model (DOM) tree based on the web content and the multi-object content. Typically, DOM trees are generated by a web browser of a user device. However, by offloading the generation of the DOM tree to a remote server, such as an optimization server, the user device may save or conserve computational power and battery power for other processes. The DOM tree that includes the first content item of the multi-object content may be sent to the user device. The DOM tree may be used by the browser executing on the user device to present the webpage via the user device, such as rendering the webpage on a display associated with the user device. The optimization server may track the data that has been sent to the user device. The DOM tree sent to the user device may be smaller than the DOM tree generated using all of the content items of the multi-object content because the DOM tree sent to the user device may only contain the first content item to be rendered with the webpage.

The content items of the multi-object content may be stored in a local cache to avoid sending all of them to the user device at once and also to avoid making multiple calls to the content server. By sending only the first content item for rendering on the webpage, the computational power necessary to render the webpage is reduced and battery power may be conserved.

In some embodiments, the user device may render the webpage using the DOM tree received from the optimization server. The optimization server may determine to update the content component of the webpage displaying the multi-object content. In some embodiments, the determination may be based on timer indicating that the content items of the multi-object content should be updated at set time intervals (e.g., every 10 seconds). The determination may be in response to a user interacting with the content item of the multi-object content displayed in the webpage on the user device. For, example, a user may swipe the display surface of a user device to indicate they wish to advance from the first content item to the next content item of the multi-object content. Other interactions may include audible commands, gestures, and/or a combination of interactions, such as a swipe or gesture after a time interval.

The optimization server may generate a second DOM tree using the next content item of the multi-object content. The second DOM tree may be compared to the DOM tree sent to the user device to identify the minimal changes that have been made. A subtree may be generated based on the minimal changes to be made to the DOM tree. The optimization server may then generate a message that includes the subtree and instructions or commands to combine the subtree with the DOM tree on the user device. Combining the subtree with the DOM tree may include, but are not limited to the operations of appending, adding, modifying, updating, or the like. By only sending the subtree having the necessary changes that need to be made to the DOM tree on the user device, the systems and methods described herein reduce the computational and battery power that would have been necessary for the user device to receive a new DOM tree generated to reflect any updates. Additionally, because the user device only has to combine the subtree with the DOM tree, only minimal changes are necessary to update the DOM tree that will be used by the web browser to update the webpage rendered on the user device.

Referring to FIG. 1, an example use case 100 for optimizing online content rendering with one or more embodiments of the disclosure. A user may be using a user device 105 to access a webpage. For example, the user may use the user device 105 to request a webpage to view news, videos, images, articles, or optimization servers 115 over one or more wired or wireless networks. For example, the user device 105 may be a smartphone and may request a webpage from the optimization server 115 over a WiFi or cellular network. Specifically, the user device 105 may send a request 102 for the webpage. The optimization server 115 may receive the request for the webpage from the user device 105. The webpage that is requested by the user device 105 may have one or more content slots or components configured to display multi-object content. The optimization server 115 may determine that the web content for the webpage requested by the user device 105 is to be obtained from a web publisher 120. The optimization server 115 may send a request 104 for web content from the web publisher 120. The optimization server 115 may send a request 106 for a multi-object content to be displayed in the content component of the webpage. The request 106 may be sent from the optimization server 115 to the content server 125.

The web publisher 120 may send a response 108 that includes the requested web content to the optimization server 115. The content server 125 may send a response 110 that includes the requested multi-object content, which may include multiple content items. The optimization server may process the received web content and multi-object content to generate a DOM tree. The DOM tree may be generated by the optimization server 115. The DOM tree may include only the first content item of the multi-object content. The DOM tree may be included the response 112 sent to the user device 105. The user device 105 may receive the response 112 and may use the DOM tree to render the webpage and the first content item 135 in the rendered content component 130.

The optimization server 115 may determine that the content component 130 needs to be updated using additional content items. The optimization server 115 may make the determination to update the content component 130 based on a timer that indicates that the content items of the multi-object content should be updated at a predetermined time interval. The predetermined time interval may be associated with the content component 130 or a rule associated with the multi-object content. The optimization server may generate a subtree associated with the additional content items and send the subtree in a message 114 to the user device 105. The user device 105 may receive the message 114 and process the message 114 to obtain the subtree. The message may also include instructions to combine the subtree and the DOM tree at a specific location of the DOM tree. The user device 105 may append the subtree to the DOM tree and may render the updated webpage using the updated DOM tree. The webpage may now depict multiple content items 135, 140, 145 of the multi-object content in the content component 130. The multiple content items 135, 140, 145, may be shown in rotation in the single content component 130. The user of the user device 105 may rotate through the multiple content items 135, 140, 145 by interacting with the content component 130.

Illustrative Processes and Use Cases

Figure 2:
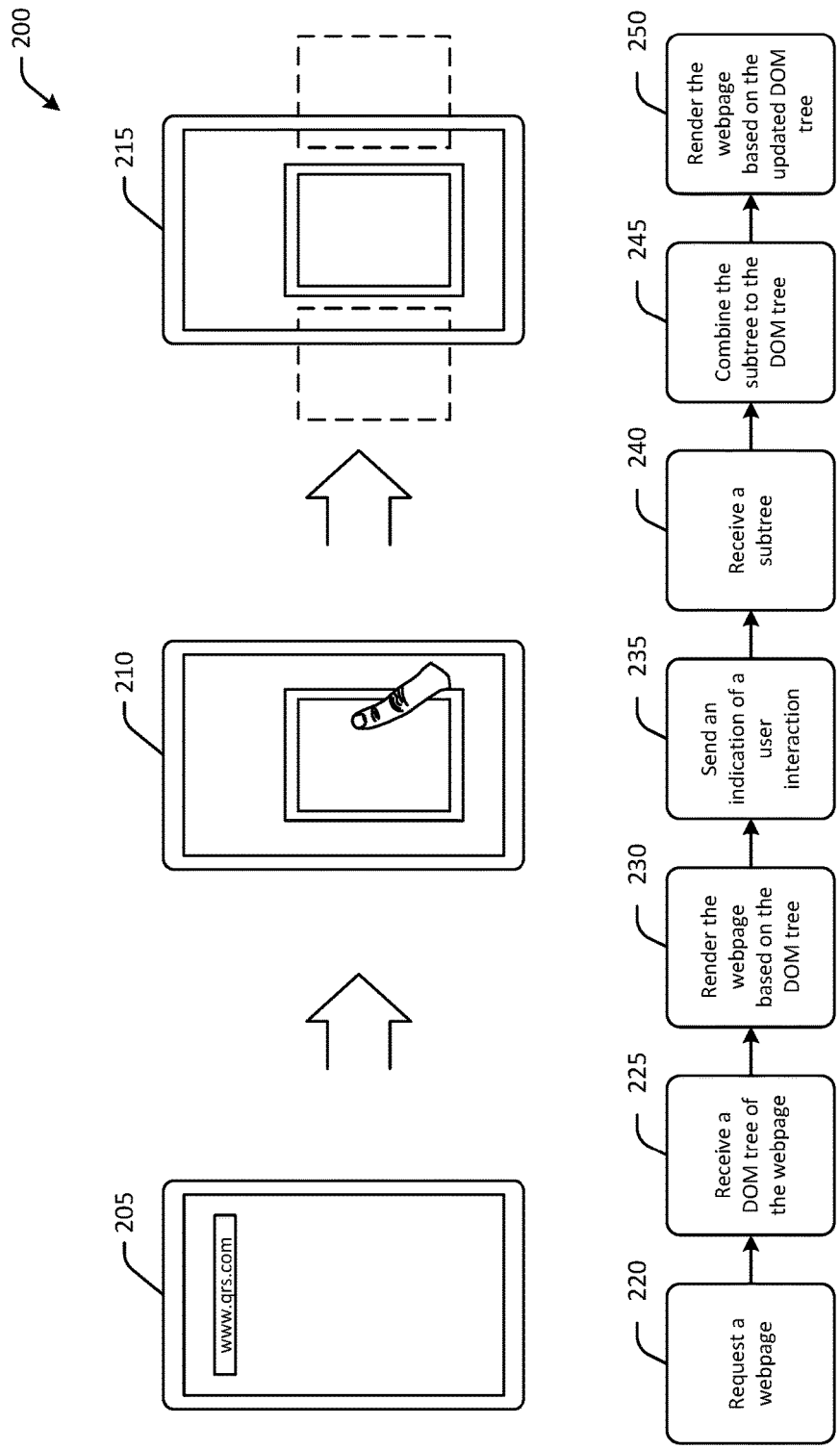
FIG. 2 is an example hybrid system and process flow diagram for optimizing online content rendering in accordance with one or more embodiments of the disclosure.

FIG. 2 is an example hybrid system and process flow diagram 200 for optimizing online content rendering in accordance with one or more embodiments of the disclosure. At a first state 205 of a user device, a user may interact with a web browser to request a webpage. For example, the user may type a uniform resource locator (URL) in an address bar of the web browser, select a URL from a drop down list, click on a URL, or the like. At a second state 210, the requested webpage may be rendered. The webpage may include a content component, such as an inline frame (iframe) configured to display multi-object content. Examples of multi-object content may include multi-product advertisements, which are also known as carousel advertisements. A multi-product advertisement may be associated with multiple advertisement creatives (e.g., content items) that are displayed in a single advertisement unit or component. A user may rotate through the different advertisement creatives of the multi-product advertisement by interacting with it.

The webpage may be rendered with a first content item of a multi-object content. A user may interact with the content component or the multi-object content by, for example, swiping, tapping, or touching a touchscreen of the user device 105. At a third state 215, the web browser may render a second content item of the multi-object content in response to the user interaction.

At operation 220, a request for a webpage may be sent from the user device 105 to an optimization server 115. At operation 225, the user device may receive a DOM tree of the webpage. The webpage may include the content component capable of displaying multiple content items associated with multi-object content. At operation 230, the web browser may render the webpage based on the DOM tree. At operation 235, the user device 105 may send an indication of a user interaction with the content item to an optimization server 115. At operation 240, the user device 105 may receive a subtree indicative of a second content item associated with the multi-object content displayed in the content component of the webpage. At operation 245, the web browser may combine the subtree and the DOM tree. At operation 250, the web browser may render the webpage using the updated DOM tree on the user device 105 for presentation to the user.

Figure 3:
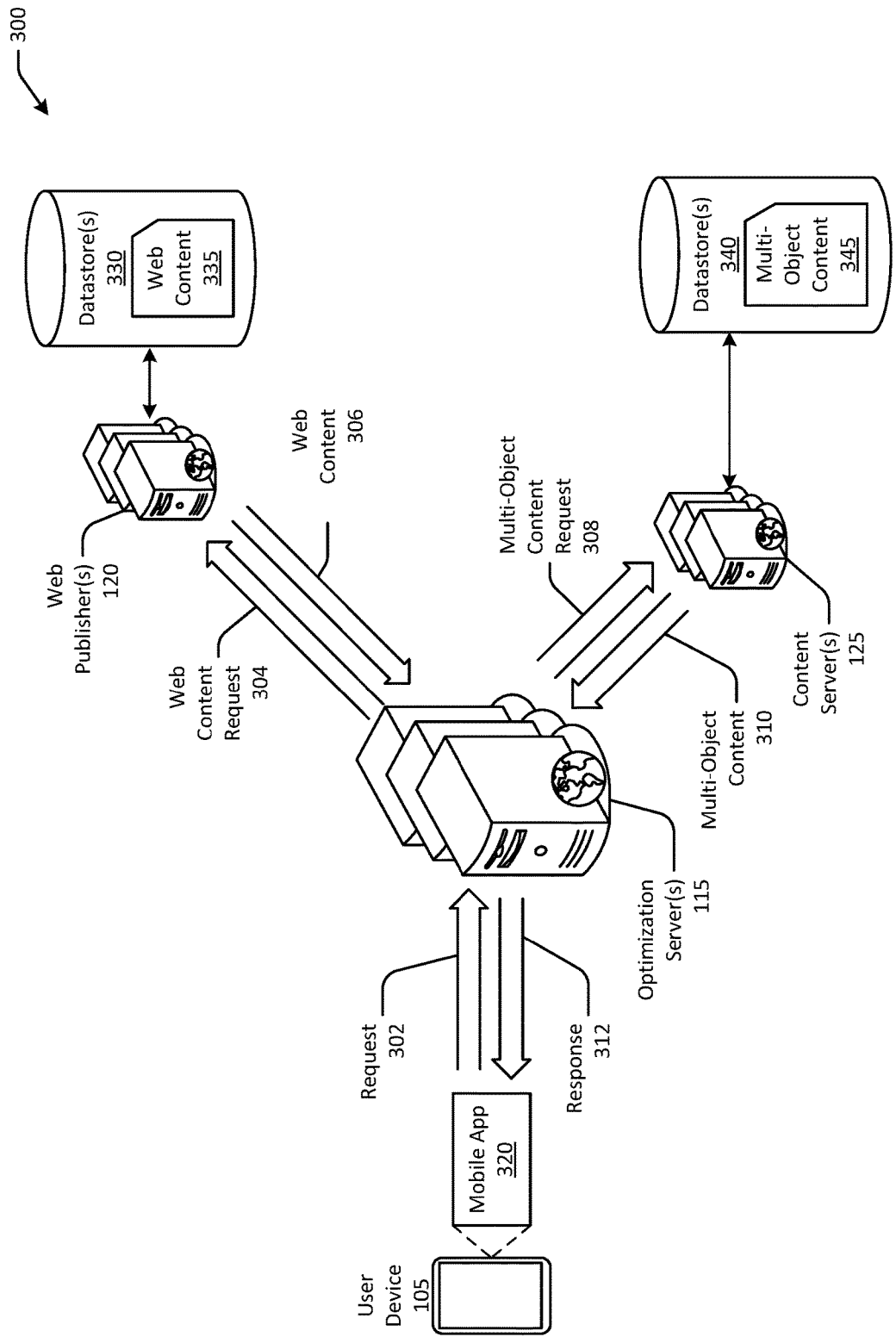
FIG. 3 is a schematic hybrid system/data flow diagram depicting various illustrative data communications between components of the system architecture depicted in FIG. 1 as part of a process for optimizing online content rendering in accordance with one or more example embodiments of the disclosure.

Now referring to FIG. 3, a schematic hybrid system/data flow diagram 300 depicts various illustrative data communications between components of the system architecture depicted in FIG. 1 as part of a process for optimizing online content rendering in accordance with one or more example embodiments of the disclosure. A user device 105 may have a web browser or a dedicated mobile application 320 for optimizing rendering a webpage and multi-object content. The user of the user device 105 may initiate a request for a webpage. For example, a user may type in a Uniform Resource Locator (URL) in an address bar of a web browser or the mobile application 320, select a URL from a drop down menu, click a URL in an email or text message, or the like. The user device 105 may generate and send a request 302 for the webpage to one or more optimization servers 115. The optimization server may determine to request the webpage from a web publisher 120 and multi-object content for a content component of the webpage from a content server 125. The optimization server 115 may send a web content request 304 to one or more web publishers 120. The web publishers may receive the request 304 and may obtain the requested web content from one or more datastores 330 that store and maintain web content 335. The web publisher 120 may generate a response that includes the requested web content 306 and send the response to the optimization server 115.

The optimization server 115 may generate a multi-object content request 308 for multi-object content to be displayed in an identified content component of the webpage. In some embodiments, the optimization server 115 may identify a user profile using information from the request 302 from the user device 105. The request from the user device 105 may include information, such as a user identifier, session identifier, device identifier, authentication token, session cookie, or the like. Based on the information, the optimization server 115 may obtain a user profile associated with the user device 105 and may analyze the user profile determine any preferences or recommendations for multi-object content. The optimization server 115 may generate the request 308 for the multi-object content based at least in part on the user profile. For example, the request 308 may indicate a type of content item, preference for a theme of content items, or the like.

The content server 125 may receive the request 308 and may communicate with one or more datastores 340 that store and maintain multi-object content 345 (e.g., as part of content items, advertisements with references to content items, etc.). The content server 125 may generate a response to include the requested multi-object content 310 and may send the response to the optimization server 115. The optimization server may store the multi-object content and any related content items in a local cache of the optimization server 115.

The optimization server 115 may process the web content 306 and the multi-object content 310 and may generate a DOM tree that may be used by the web browser or mobile application 320 of the user device 105 to render the webpage. The optimization server 115 may generate a DOM tree to send to the user device 105. The DOM tree may include only the first content item of the multi-object content, to reduce the size of the data to be sent to the user device 105. The DOM tree may be included in the response 312 to the request 302 for a webpage and sent to the user device 105. The user device 105 may receive the response 312 and may use the DOM tree to render the webpage for display to the user device 105.

The optimization server 115 may determine to update the content component of the webpage. The determination may be made based on a timer associated with the content component that indicates that the content component is to be updated at predetermined time intervals or based on a user's interaction with the content component or multi-object content. The optimization server 115 may generate a subtree based on the next content item to be displayed in the content component as part of the multi-object content and send a message that includes the subtree to the user device 105. The user device 105 may receive the message and obtain the subtree and commands or instructions regarding where in the DOM tree of the user device 105 to append the subtree. The user device 105 may append the subtree at the specified location of the DOM tree and use the updated DOM tree to render the updated content component displaying the multi-object content.

Figure 4A:
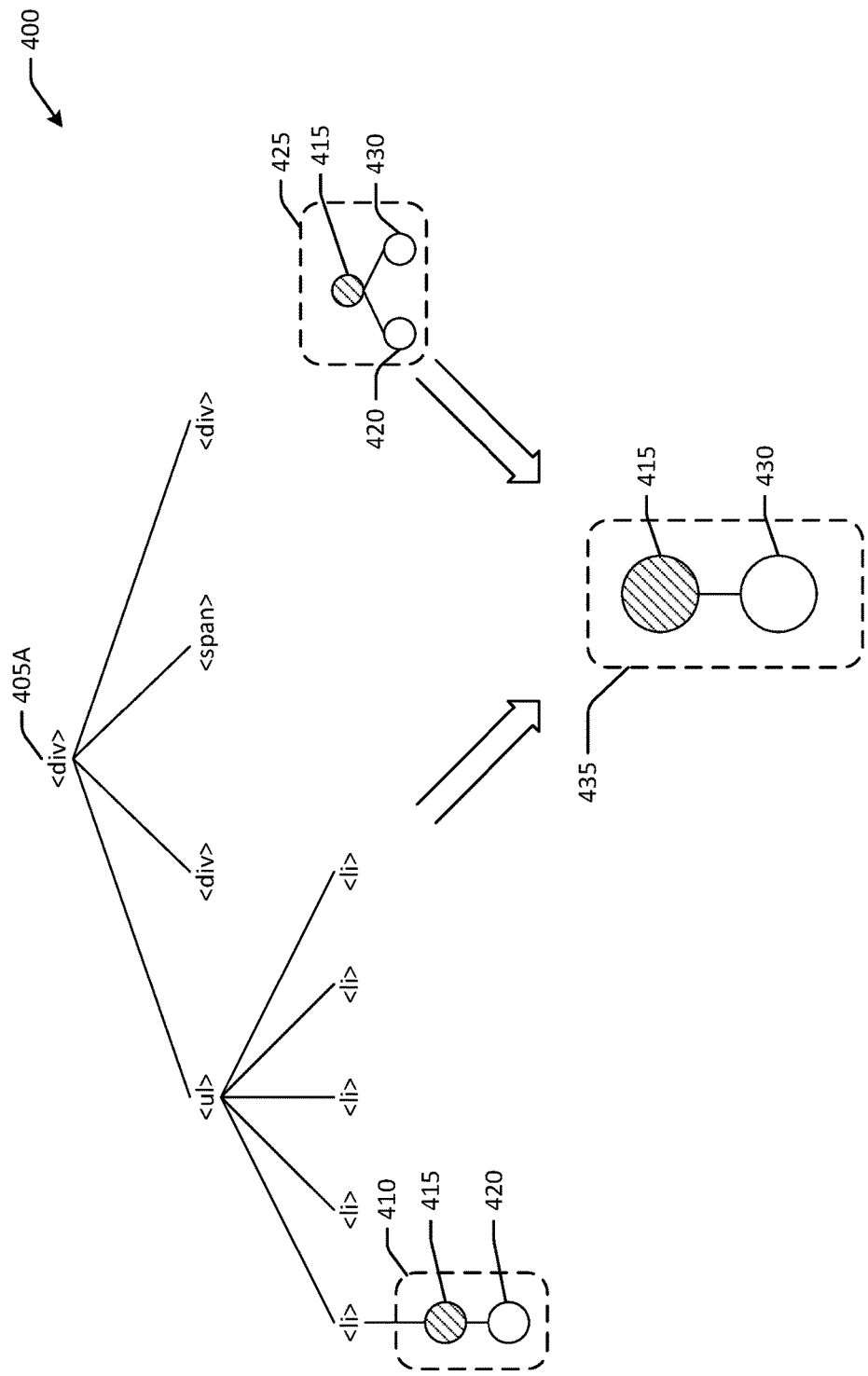
FIG. 4A is an example diagram depicting a data flow for generating a subtree for optimizing online content rendering in accordance with one or more embodiments of the disclosure.

Now referring to FIG. 4A, an example diagram depicting a data flow 400 for generating a subtree for optimizing online content rendering in accordance with one or more embodiments of the disclosure is depicted. In some embodiments, the optimization server 115 may have constructed a DOM tree 405A based on web content and multi-object content. To generate a subtree 435, the DOM tree 405A may be traversed, for example, using a depth first search, to find an element, such a list structure (e.g., unordered list tag, denoted by "<ul>"). The optimization server 115 may determine that a content component is likely a list item, denoted by "<li>", of a list structure. The optimization server 115 may traverse the DOM tree 405A to identify a portion of the DOM tree 405A on the optimization server 115 that may correspond to a generated second DOM tree 425 that is indicative of a partial update to the webpage. For example, the partial update to the web page may be displaying the additional content items of the multi-object content displayed in the content component of the webpage. In some embodiments, the optimization server 115 may compare the subtree 410 of the list item to the generated second DOM tree 425 to determine if that portion of the DOM tree 405A is the portion of the webpage that needs to be updated. The nodes in the subtree 410 may be compared to the second DOM tree 425 and the subtree 435 may be generated to include the fewest number of nodes necessary to update the DOM tree of the user device 105. The root node 415 of the subtree may be identified using a unique identifier that may indicate the location of the root node 415 in the DOM tree 405A or a path to reach the root node 415 in the DOM tree 405A. Instructions or commands to combine the subtree with the DOM tree of the user device 105 may also be generated.

Figure 4B:
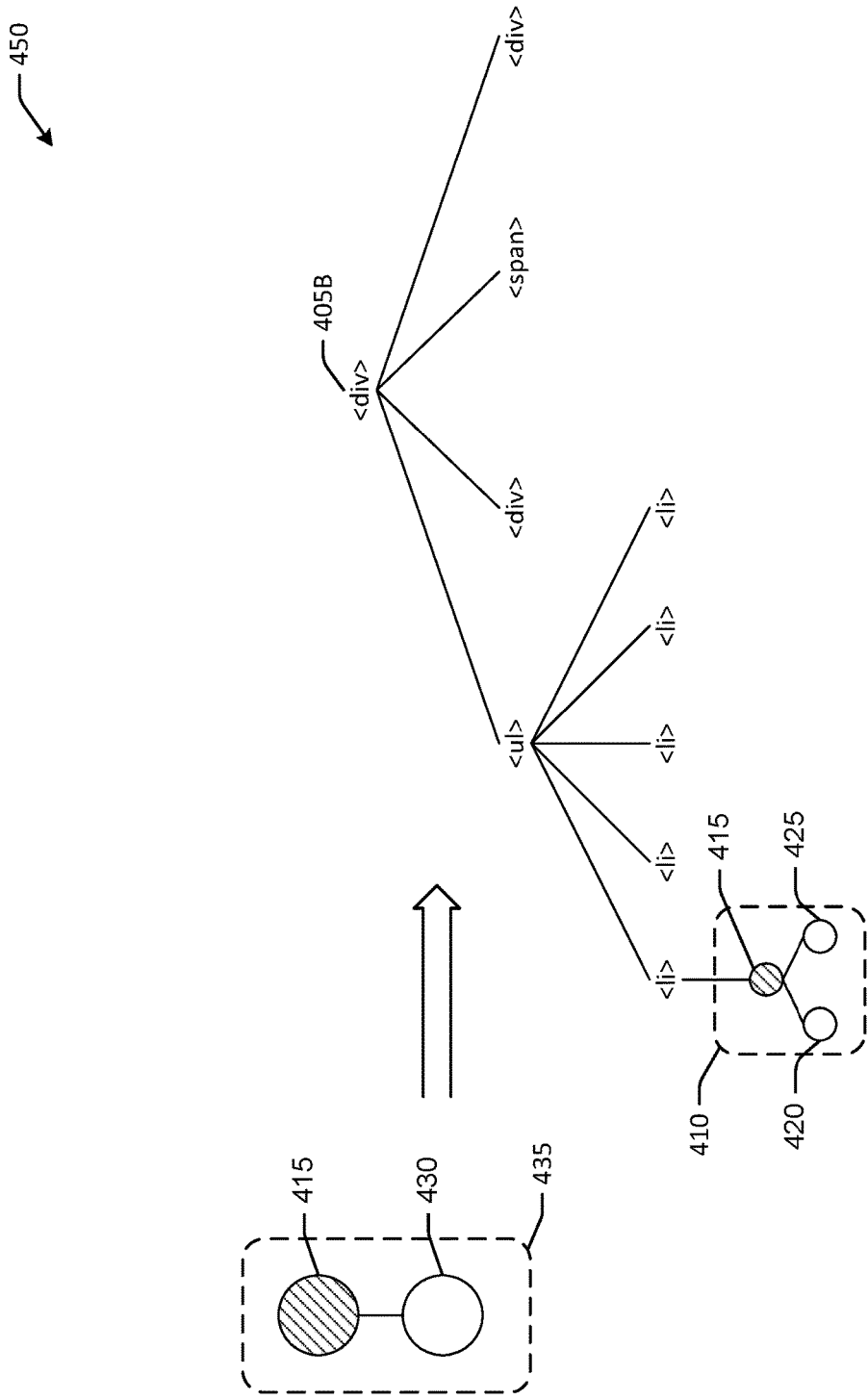
FIG. 4B is an example diagram depicting a data flow for updating a DOM tree of the user device using a subtree for optimizing online content rendering in accordance with one or more embodiments of the disclosure.

Now referring to FIG. 4B, an example diagram depicting a data flow 450 for updating a DOM tree 405B of the user device 105 using a subtree 435 for optimizing online content rendering in accordance with one or more embodiments of the disclosure. In some embodiments, the subtree 435 may have been transmitted to the user device 105. The web browser or mobile application may analyze the subtree 435 and any related commands or instructions received in conjunction with the subtree 435. In some embodiments, the command may identify a unique identifier associated with the root node 415 of the subtree 435. The unique identifier may represent a location of a corresponding node in the DOM tree 405B of the user device 105 or a path to the corresponding node 415 in the DOM tree 405B. The web browser or mobile application may identify the root node 415 of the DOM tree 405B and may combine the subtree 435 and the DOM tree 405B. In some embodiments, the web browser or mobile application may determine to append the new node 430 to the root node 415 of the DOM tree 405B of the user device, thereby updating the DOM tree 405B. The web browser or mobile application can then use the updated DOM tree 405B to render the webpage on the user device 105.

Figure 5:
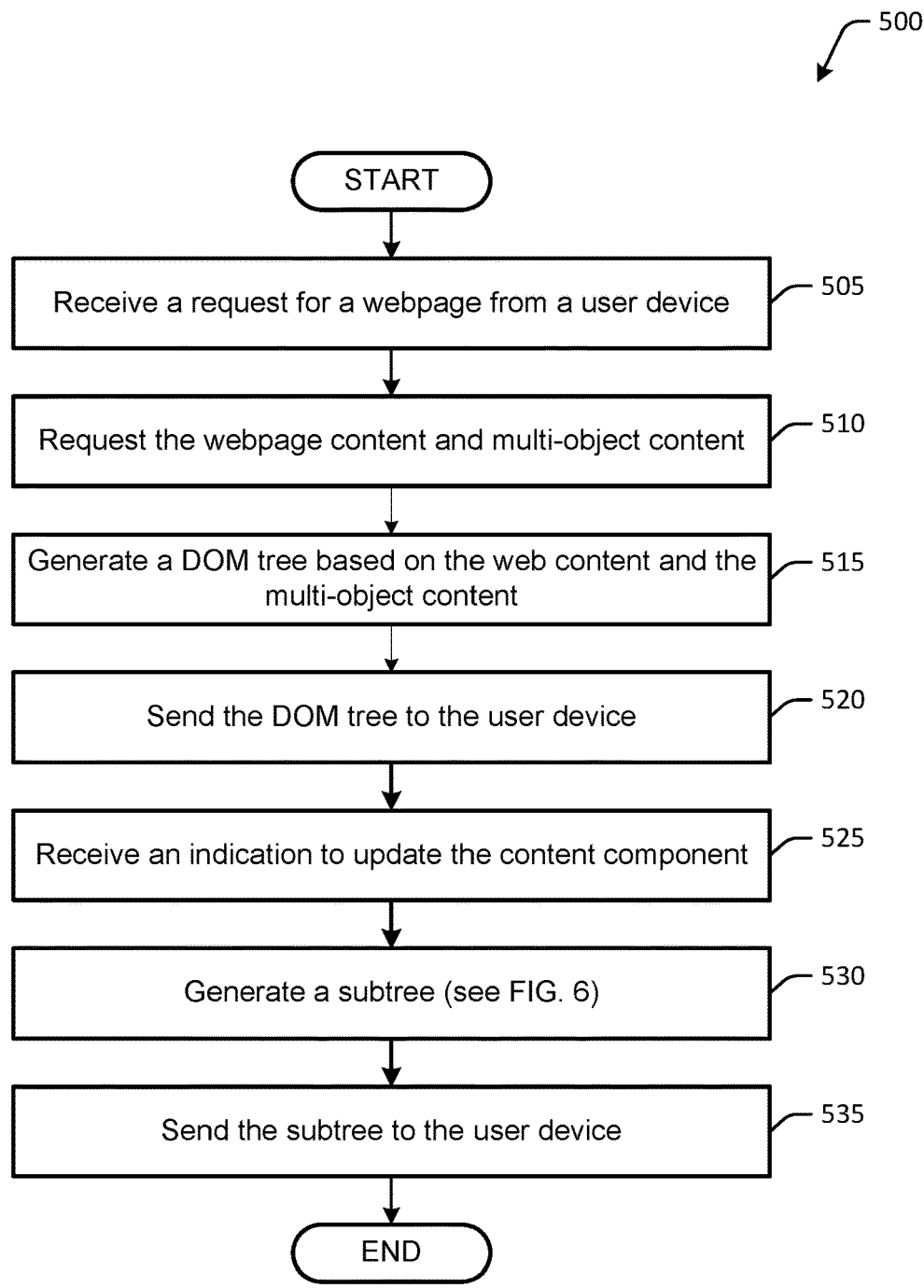
FIG. 5 is an example process flow diagram for optimizing online content rendering by an optimization server in accordance with one or more embodiments of the disclosure.

Referring to FIG. 5, an example process flow 500 for optimizing online content rendering by an optimization server in accordance with one or more embodiments of the disclosure is depicted. Although certain operations are illustrated as occurring separately in FIG. 5, some or all of the operations may occur concurrently or partially concurrently across one or more computer systems. One or more operations may be optional in FIG. 5. At block 505, a request for a webpage is received from a user device 105. In some embodiments, the request may be generated by a user device 105 and sent to an optimization server 115. The data management module of the optimization server 115 may receive and process the request. The data management module may parse the request and determine that the request is associated with web content from a web publisher 120. The data management module may determine that the web content includes content component configured to display multi-object content.

At block 510, the webpage content and multi-object content are requested. The data management module may generate a web content request and send the request to the web publisher 120. The web content request may include information from the request from the user device 105. For example, the information from the user device 105 may indicate the type of device, a location of the device, session information, or the like. In some embodiments, the web content request may be an HTTP request.

The data management module may generate a multi-object content request and send the multi-object content request to the content server 125. In some embodiments, the multi-object content request may include an indication of a type of content to be displayed in the requested webpage. The multi-object content request may include information from the request from the user device 105. For example, the information from the request from the user device 105 may indicate the type of device, a location of the device, user demographic information, browsing history, user behavior history, and the like. In some embodiments, the multi-object content request may be an HTTP request.

The data management module may receive a response from the web publisher 120. The response may include the requested web content. For example, the response may include a document indicative of a webpage, such as an HTML document. The data management module may receive a response from the content server 125. The response may include one or more requested multi-object content. In some embodiments, the multi-object content may include or be associated with multiple content items, such as videos, pictures, images, or the like. The data management module may have indicated in the request for the multi-object content for all the content items associated with the multi-object content be sent to the optimization server 115. The data management module may receive the response that includes multiple content items and may store the content items in a local cache of the optimization server 115. In some embodiments, by fetching all of the content items in a single response and storing them in a local cache, the optimization server 115 may avoid making multiple calls to the content server 125 for individual content items as they are needed, thus decreasing the network bandwidth necessary to obtain and send the requested multi-object content to the user device 105 for rendering.

At block 515, a DOM tree may be generated based on the web content and the multi-object content. In some embodiments, the data management module may send the received document indicative of a webpage to a parser. The parser may read the raw bytes of the document (e.g., HTML document) and translate them to individual characters based on specified encoding of the file (e.g., UTF-8). The parser may convert the strings of characters into distinct tokens (e.g., HTML5 standard). For example, "<html>", "<body>", or other strings within angle brackets. Each token may have a special meaning and its own set of associated rules. The parser may convert the tokens into objects, which define their properties and rules. The parser may construct the DOM tree using the generated objects. Because document indicative of the webpage may define relationships between different tags (e.g., some tags are contained within other tags, etc.), the created objects are linked in a tree data structure that also captures the parent-child relationships defined in the original document indicative of the webpage.

At block 520, the DOM tree is sent to the user device 105. In some embodiments, the parser may send the DOM tree to the data management module. The data management module may generate a response to the request for the webpage and may include the DOM tree in the message. The DOM tree may include the first content item to be displayed in the content component for the multi-object content. The additional content items may be stored in the local cache of the optimization server 115. The message may be sent to the user device 105 and the user device may use the DOM tree from the message to render the webpage on the user device 105.

At block 525, an indication to update the content component is received. In some embodiments, the data management module may receive a message from the user device 105. The message may comprise an indication that a user of the user device 105 interacted with the content component or the content item displayed in content component of the webpage. In some embodiments, the content component may be an inline frame (iframe) designated within the webpage to display multi-object content (e.g., carousel advertisements). In some embodiments, the user may interact (e.g., swipe, touch, tap, etc.) with the content component via a touchscreen of the user device 105. The user device 105 may generate an indication of a user interaction, generate a message including the indication of the user interaction, and send the message to the optimization server 115. Other types of user interaction may include, but are not limited to, voice captured via a microphone of the user device, mouse click captured by a mouse or mousepad of the user device 105, clicking a button of the user device 105 mapped to correspond to the content component, or the like.

At block 530, a subtree is generated. In some embodiments, the optimization server 115 may receive the message from the user device 105. The data management module of the optimization server 115 may determine that the content component of the webpage rendered on the user device 105 needs to be updated to render at least a second content item. The data management module may send the indication of the user interaction to an optimization module. The optimization module may process the indication of the user interaction as well as additional information from the message to determine that the content component, for example, is displaying a multi-object content and has requested a second content item to display in the content component. The optimization module may retrieve or otherwise obtain the second content item associated with the multi-object content currently depicted in the content component. In some embodiments, the second content item may be obtained from the local cache of the optimization server 115. In some embodiments, the optimization module may generate a subtree (further described in FIG. 6) based at least in part on the second content item and the DOM tree associated with the webpage. The optimization module may generate a unique identifier associated with the root element of the subtree based at least in part on the DOM tree. The optimization module may generate instructions to append the subtree to the DOM tree on the user device 105. The optimization module may update the DOM tree (e.g., stored on the optimization server 115) using the subtree.

At block 535, the subtree is sent to the user device 105. The data management module may send the subtree, the identifier associated with the root element of the subtree, and the instructions or commands to combine the subtree and the DOM tree of the user device 105.

Figure 6:
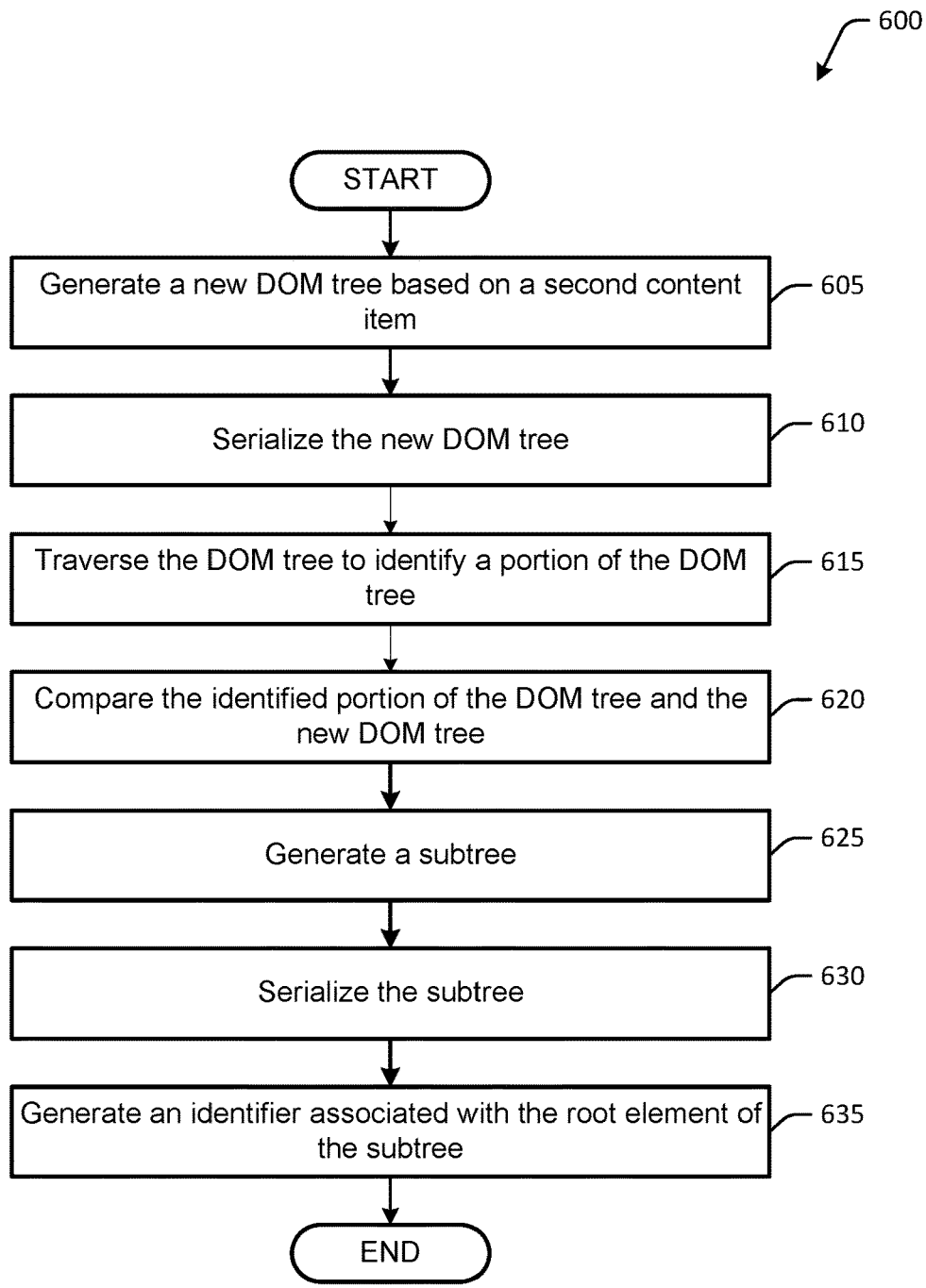
FIG. 6 is an example process flow diagram for generating a subtree for use in a process for optimizing online content rendering in accordance with one or more embodiments of the disclosure.

Referring to FIG. 6, an example process flow 600 for generating a subtree for use in a process for optimizing online content rendering in accordance with one or more embodiments of the disclosure is depicted. Although certain operations are illustrated as occurring separately in FIG. 6, some or all of the operations may occur concurrently or partially concurrently across one or more computer systems. One or more operations may be optional in FIG. 6. At block 605, a new DOM tree may be generated based at least in part on the second content item associated with the multi-object content. In some embodiments, the data management module may obtain the second content item, for example, from a local cache of the optimization server 115. The data management module may send the second content item to the parser. The parser may translate the bytes of the second content item into individual characters based on specified encoding of the file. The parser may convert the strings of characters into distinct tokens. The parser may convert the tokens into objects and may generate a new DOM tree using the objects.

At block 610, the new DOM tree may be serialized. The new DOM tree may be sent to the optimization module. The optimization module may store each leaf of the new DOM tree in a new DOM tree array.

At block 615, the DOM tree may be traversed to identify a portion of the DOM tree. For example, the optimization module may retrieve the DOM tree from the local cache and perform a traversal, such as a depth first search, to identify a portion of the DOM tree that correspond to the new DOM tree, by looking for a portion of the DOM tree that includes a group of nodes (e.g., or a root node) similar to the new DOM tree. In some embodiments, the optimization module may identify a pointer that indicates the portion of the DOM tree similar to the new DOM tree.

At block 620, the identified portion of the DOM tree may be compared to the new DOM tree. The optimization module may store the leaf nodes of the identified portion of the DOM tree in a DOM tree array. For example, the leaf nodes may be stored in contiguous order in the array.

At block 625, a subtree may be generated. The optimization module may compare the new DOM tree array to the DOM tree array to identify differences. For example, the optimization module may determine that an item is present in both the new DOM tree array and the DOM tree array, meaning no change needs to occur. The optimization module may determine that the item is present in the DOM tree array but not the new DOM tree array because all the leaf nodes in the DOM tree array are not present in the new DOM tree array. The optimization module may determine that item is not present in the DOM tree array and present in the new DOM tree array because all the leaf nodes of the new DOM tree array are absent from the DOM tree array. The optimization tree may use the nodes in the new DOM tree array and the DOM tree array to construct the subtree necessary to update the DOM tree to reflect the next state of the content component.

At block 630, the subtree may be serialized. The optimization module may store the leaf nodes to the subtree in a subtree array.

At block 635, an identifier associated with the root element of the subtree may be generated. The identifier may be a unique identifier and may indicate a location of the node within the context of the subtree or DOM tree.

Figure 7:
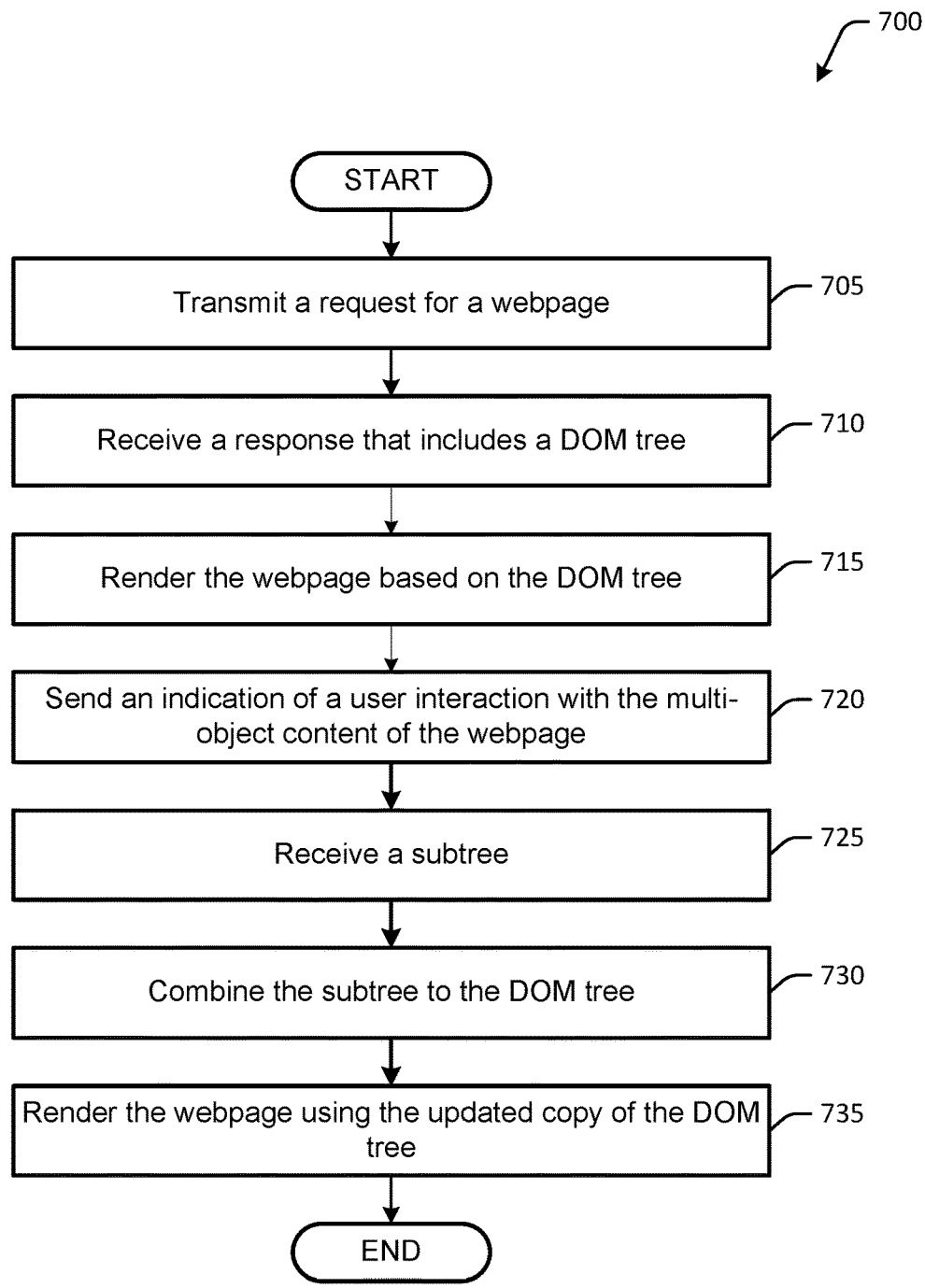
FIG. 7 is an example process flow diagram for optimizing online content rendering on a user device in accordance with one or more embodiments of the disclosure.

Referring to FIG. 7, an example process flow 700 for optimizing online content rendering on a user device 105 in accordance with one or more embodiments of the disclosure is depicted. Although certain operations are illustrated as occurring separately in FIG. 7, some or all of the operations may occur concurrently or partially concurrently across one or more computer systems. One or more operations may be optional in FIG. 7. At block 705, a request for a webpage is sent. In some embodiments, a web browser or a client application on the user device 105 may generate a request. In some embodiments, the request may be generated based at least in part on an interaction of the user with the user device, such as typing a URL, clicking on a URL, selecting a URL from a list, or the like. The web browser or client application may generate a request that includes the URL and send the message to the optimization server 115.

At block 710, a response that includes a DOM tree may be received. In some embodiments, the optimization server 115 may obtain the requested webpage (e.g., web content and one or more content items) and may generate a DOM tree. The DOM tree may be sent to the user device 105 in a response to the request for the webpage.

At block 715, the webpage is rendered based at least in part on the DOM tree. In some embodiments, the web browser or client application may generate a render tree using the DOM tree by traversing each visible node of the DOM tree starting from the root node. The nodes in the DOM tree that are not visible (e.g., script tags, meta tags, etc.) may be omitted since they are not reflected in the rendered output. Some nodes may be hidden via CSS and are also omitted from the render tree. For example, a SPAN node may be missing from the render tree because an explicit rule associated with the SPAN node may set the "display:none" property on it. For each visible node identified in the traversal of the DOM tree, the web browser may find the appropriate matching CSSOM rules and apply them. The render tree may be constructed using the visible nodes of the DOM tree and relevant nodes of a CCSOM tree. The web browser or client application may paint or draw the render tree nodes onto the screen of the user device 105.

At block 720, an indication of a user interaction with the multi-object content of the webpage may be sent to the optimization server 115. In some embodiments, sensor of the user device 105, such as the touch screen, may identify a user interaction by the user with a content component of the webpage and generate an indication of the user interaction. For example, the user may interact with the content component by tapping, swiping, or touching the touchscreen of the user device 105. The user device 105 may use the data generated by the sensor associated with the touchscreen to generate an indication of the user interaction by the user with the content component.

At block 725, a subtree may be received. The subtree may be indicative of a second content item that should be displayed in the content component of the webpage. The subtree may be received by the web browser or client application in a response with instructions or commands indicating where to append the subtree to the DOM tree. The web browser or client application may process the response to obtain the subtree, a unique identifier associated with the root of the subtree (indicating where, for example, in the copy of the DOM tree that the subtree should be appended), and the instructions to combine the subtree and the DOM tree.

At block 730, the subtree is combined with the DOM tree. In some embodiments, the web browser or client application may append the subtree to the DOM tree. This enables the web browser to efficiently update the DOM tree rather than having to destroy the DOM tree and creating a new DOM tree that includes the subtree. By utilizing a subtree generated by the optimization server 115, the user device 105 does not have to receive an entirely new DOM tree each time there is an update that needs to be made to the rendered webpage on the user device 105.

At block 735, the webpage may be rendered using the updated copy of the DOM tree. In some embodiments, the web browser or client application may use the updated DOM tree to update the render tree and draw the updates to the screen of the user device 105.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
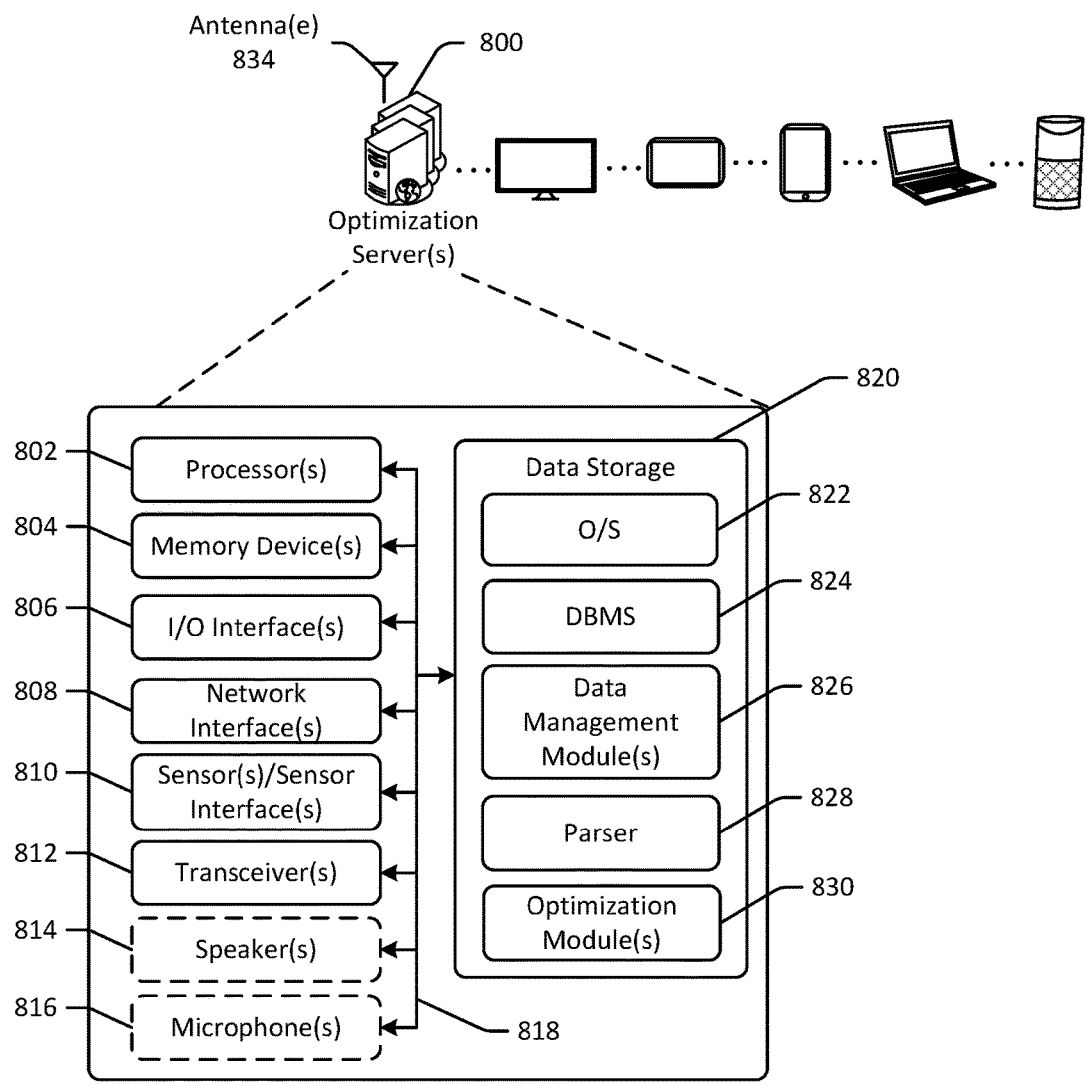
FIG. 8 schematically illustrates an example architecture of a optimization server in accordance with one or more embodiments of the disclosure.

FIG. 8 is a schematic block diagram of one or more illustrative optimization server(s) 800 in accordance with one or more example embodiments of the disclosure. The optimization server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like. The optimization server(s) 800 may correspond to an illustrative device configuration for the optimization servers of FIGS. 1-7.

The optimization server(s) 800 may be configured to communicate via one or more networks with one or more servers, user devices, or the like. The optimization server(s) 800 may be configured to obtain webpage content and multi-object content, generating DOM trees, transmitting a DOM tree to a requesting user device, determining to update a content component of the webpage, generating a subtree, transmitting the subtree with instructions to append the subtree to the DOM tree on the user device, and other operations.

The optimization server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the optimization server(s) 800 may include one or more processors (processor(s)) 802, one or more memory devices 804 (generically referred to herein as memory 804), one or more input/output (I/O) interfaces 806, one or more network interfaces 808, one or more sensors or sensor interfaces 810, one or more transceivers 812, one or more optional speakers 814, one or more optional microphones 816, and data storage 820. The optimization server(s) 800 may further include one or more buses 818 that functionally couple various components of the optimization server(s) 800. The optimization server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the optimization server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the optimization server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more data management module(s) 826, a parser 828, and/or one or more optimization module(s) 830. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by components of the optimization server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, web content, advertisement campaigns, advertisements, content items, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the optimization server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the data management module(s) 826 may include computer-executable instructions, code, or the like that responsive to execution by one or more of the processor(s) 802 may perform functions including, but not limited to, receiving requests for a webpage, generating and transmitting requests for web content and multi-object content, receiving responses comprising the web content and multi-object content.

The parser(s) 828 may include computer-executable instructions, code, or the like that responsive to execution by one or more of the processor(s) 802 may perform functions including, but not limited to, receiving a document indicative of a webpage, processing the document to generate tokens, convert the tokens into objects, use the objects to construct a DOM tree, and the like.

The optimization module(s) 830 may include computer-executable instructions, code, or the like that responsive to execution by one or more of the processor(s) 802 may perform functions including, but not limited to, generating a DOM tree, traversing the DOM tree to identify a portion of the DOM tree, generate a subtree, update the DOM tree, and the like.

Referring now to other illustrative components depicted as being stored in the data storage 820, the O/S 822 may be loaded from the data storage 820 into the memory 804 and may provide an interface between other application software executing on the optimization server(s) 800 and the hardware resources of the optimization server(s) 800. More specifically, the O/S 822 may include a set of computer-executable instructions for managing hardware resources of the optimization server(s) 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the optimization server(s) 800 is a mobile device, the DBMS 824 may be any suitable lightweight DBMS optimized for performance on a mobile device.

Referring now to other illustrative components of the optimization server(s) 800, the input/output (I/O) interface(s) 806 may facilitate the receipt of input information by the optimization server(s) 800 from one or more I/O devices as well as the output of information from the optimization server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the optimization server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The optimization server(s) 800 may further include one or more network interface(s) 808 via which the optimization server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna (e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the optimization server(s) 800 to communicate with other devices. The transceiver(s) 812 may include hardware, software, and/or firmware for modulating, transmitting, or receiving —potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the optimization server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the optimization server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the optimization server(s) 800 may include alternate and/or additional hardware, software, or firmware components beyond those described or depicted without departing from the scope of the disclosure. More particularly, it should be appreciated that software, firmware, or hardware components depicted as forming part of the optimization server(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s).

Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving, by one or more computer processors coupled to at least one memory, a first request from a user device for a webpage;
receiving, from a web publisher, a document indicative of the webpage;
determining that the webpage comprises an inline frame, wherein the inline frame displays multi-object content;
sending a request for the multi-object content comprising a plurality of content items;
receiving, from a server, the multi-object content to include in the inline frame;
generating a Document Object Model (DOM) tree based at least in part on the webpage and a first content item of the plurality of content items of the multi-object content;
sending, to the user device, the DOM tree;
receiving, from the user device, an indication of a user interaction with the first content item;
generating a subtree based at least in part on the DOM tree and a second content item of the plurality of content items;
generating an identifier associated with a root element of the subtree based at least in part on the DOM tree;
sending, to the user device, the subtree, the identifier, and a command to append the subtree to the DOM tree of the user device at a location of the DOM tree indicated by the identifier; and
causing the user device to render the second content item in the inline frame.

2. The method of claim 1, wherein the method further comprises:
serializing the subtree, wherein serializing the subtree includes storing each leaf of the subtree in an array; and
sending, to the user device, the array.

3. The method of claim 1, wherein generating the subtree further comprises:
generating a second DOM tree based at least in part on the second content item;
comparing the DOM tree and the second DOM tree; and
generating the subtree based at least in part on a difference of a portion of the DOM tree and the second DOM tree.

4. A method comprising:
determining, by one or more computer processors coupled to at least one memory, that a document indicative of a webpage comprises a content component, wherein the content component is configured to display multi-object content;
receiving the multi-object content comprising a plurality of content items;
generating a Document Object Model (DOM) tree based at least in part on the document and at least a first content item of the plurality of content items of the multi-object content;
sending the DOM tree to a user device;
receiving an indication of a user interaction with the first content item;
generating a subtree based at least in part on the DOM tree and a second content item of the plurality of content items;
determining an identifier associated with a root element of the subtree based at least in part on the DOM tree;
sending, to the user device, the subtree, the identifier, and a command to append the subtree to the DOM tree at a location of the DOM tree indicated by the identifier; and
causing the user device to render the second content item in the content component.

5. The method of claim 4, wherein the DOM tree is a first DOM tree and generating the subtree further comprises:
generating a second DOM tree based at least in part on the second content item;
comparing the first DOM tree and the second DOM tree to determine a difference; and
generating the subtree based at least in part on the difference.

6. The method of claim 4, wherein generating the subtree further comprises:
determining a time associated with displaying the plurality of content items has reached a predetermined threshold based on a timer associated with the content component; and
determining to generate the subtree based at least in part on the time.

7. The method of claim 4, wherein generating the subtree further comprises:
  receiving, from the user device, an indication of a user interaction with the first content item; and
  generating the subtree based at least in part on the indication of the user interaction.

8. The method of claim 4, further comprising:
receiving a request for the webpage;
determining a user profile based at least in part on a request for the webpage; and
generating a request for the multi-object content based at least in part on the user profile.

9. The method of claim 4, further comprising:
serializing the DOM tree, wherein serializing the DOM tree includes storing each node of the DOM tree in a DOM tree array; and
sending, to the user device, the DOM tree array.

10. The method of claim 4, wherein generating the DOM tree further comprises:
  parsing the document and the plurality of content items into a plurality of tokens;
  converting the plurality of tokens into a plurality of objects; and
  generating the DOM tree based at least in part on the plurality of objects.

11. The method of claim 4, further comprising:
storing the plurality of content items in a local cache.

12. A device comprising:
  at least one memory that stores computer-executable instructions; and
  at least one processor configured to access the at least one memory and execute the computer-executable instructions to:
    determine that a document indicative of a webpage comprises a content component, wherein the content component is configured to display multi-object content;
    receive the multi-object content comprising a plurality of content items;
    generate a first Document Object Model (DOM) tree based at least in part on the document and the plurality of content items of the multi-object content;
    generate a second DOM tree based at least in part on a portion of the first DOM tree and a first content item of the plurality of content items;
    send the second DOM tree to a user device;
    receive an indication of a user interaction with the first content item;
    generate a subtree based at least in part on the second DOM tree and a second content item of the plurality of content items;
    determine an identifier associated with a root element of the subtree based at least in part on the second DOM tree;
    send, to the user device, the subtree, the identifier, and a command to append the subtree to the second DOM tree of the user device at a location of the second DOM tree indicated by the identifier; and
    cause the user device to render the second content item in the content component.

13. The device of claim 12, wherein the at least one processor is further configured to access the at least one memory and execute the computer-executable instructions to:
  serialize the second DOM tree, wherein to serialize the second DOM tree includes storing each node of the second DOM tree in a DOM tree array; and
  send the DOM tree array to the user device.

14. The device of claim 12, wherein the at least one processor is further configured to access the at least one memory and execute the computer-executable instructions to:
  store the plurality of content items in a local cache.

15. The device of claim 12, wherein, to generate the subtree, the at least one processor is further configured to access the at least one memory and execute the computer-executable instructions to:
  receive an indication of a user interaction with the first content item; and
  generate the subtree based at least in part on the indication of the user interaction.

16. The device of claim 12, wherein, to generate the subtree, the at least one processor is further configured to access the at least one memory and execute the computer-executable instructions to:
  determine a time associated with displaying the multi-object content has reached a predetermined threshold based on a timer associated with the content component; and
  determine to generate the subtree based at least in part on the time.

17. The device of claim 12, wherein the at least one processor is further configured to access the at least one memory and execute the computer-executable instructions to:
  receive a request for the webpage;
  determine a user profile based at least in part on a request for the webpage; and
  generate a request for the multi-object content based at least in part on the user profile.

* * * * *